US005486922A

United States Patent [19]

Cordova

[11] Patent Number: 5,486,922

[45] Date of Patent: Jan. 23, 1996

[54] SENSOR COIL WITH THERMOMECHANICALLY-MATCHED SPOOL FOR FIBER OPTIC GYROSCOPE

[75] Inventor: Amado Cordova, West Hills, Calif.

[73] Assignee: Litton Systems, Inc., Woodland Hills, Calif.

[21] Appl. No.: 359,424

[22] Filed: Dec. 20, 1994

[51] Int. Cl.$^6$ .......... G01C 19/64

[52] U.S. Cl. .......... 356/350

[58] Field of Search .......... 356/350

[56] References Cited

U.S. PATENT DOCUMENTS

| | | | |
|---|---|---|---|
| 4,793,708 | 12/1988 | Bednarz | 356/350 |
| 4,856,900 | 8/1989 | Ivancevic | 356/350 |
| 5,260,768 | 11/1993 | Cordova et al. | 356/350 |
| 5,333,214 | 7/1994 | Huang et al. | 356/350 X |
| 5,371,593 | 12/1994 | Cordova et al. | 356/350 |

OTHER PUBLICATIONS

N. Frigo, "Compensation of Linear Sources of Non–Reciprocity in Sagnac Interferometers", Fiber Optics and Laser Sensors I, Procs. SPIE, vol. 412, p. 261 (1981).

*Primary Examiner*—Vincent P. McGraw
*Attorney, Agent, or Firm*—Elliott N. Kramsky

[57] ABSTRACT

A spool for receiving a fiber optic sensor coil is selectively fabricated of materials of different coefficients of thermal expansion to thereby mimic the anisotropic thermal expansion characteristics of a potted sensor coil. The spool can include one or a pair of planar flanges fixed to the end(s) of a central cylindrical hub. The hub is preferentially fabricated in part of a polymer while the flange(s) is of low coefficient of expansion material such as titanium to thereby approximate the differential thermal expansions of a potted sensor coil in the axial and radial directions, respectively.

29 Claims, 4 Drawing Sheets

SENSOR COIL WITH THERMOMECHANICALLY-MATCHED SPOOL FOR FIBER OPTIC GYROSCOPE

BACKGROUND

1. Field of the Invention

The present invention relates to sensor coils for fiber optic gyroscopes. More particularly, this invention pertains to a sensor coil for use in a fiber optic gyroscope that is mounted upon a spool designed for anisotropic thermal expansion characteristics to thereby mimic the coil and thereby reduce bias error-inducing mechanical stresses.

2. Description of the Prior Art

A fiber optic gyroscope 10 comprises the following main components as illustrated in the schematic diagram of FIG. 1: a light source 12; one or two beamsplitters 14, 15 (fiber optic directional couplers and/or an integrated-optics Y-junctions); a fiber optic coil 16; a polarizer 18 (and sometimes one or more depolarizers); and a detector 20. Light from the light source 12, after passing through polarizer 18, is split by the beamsplitter 15 into copropagating and counterpropagating waves that travel through the sensing coil 16. Associated electronics 22 measures the phase relationships between the two interfering, counterpropagating beams of light that emerge from the opposite ends of the coil 16 and impinge upon the detector 20 after passing through the beamsplitter 14. The difference between the phase shifts experienced by the two beams provides a measure of the rate of rotation of the platform to which the instrument is fixed.

Environmental factors can affect the measured phase shift difference between the counterpropagating beams, thereby introducing a bias error. Such environmental factors include variables such as temperature, vibration (acoustical and mechanical) and magnetic fields. These are both time-varying and unevenly distributed throughout the coil and induce variations in index of refraction and length that each counterpropagating wave encounters as it travels through the coil. The phase shifts imposed upon the two waves due to environmental factors can be unequal, producing a net undesirable phase shift which is indistinguishable from the rotation-induced signal.

One approach to reducing the sensitivity arising from environmental factors has involved the use of symmetric coil winding configurations. In such coils, the windings are arranged so that the geometrical center of the winding is located at the innermost layer while the two ends of the coil are located at the outermost layers.

N. Frigo has proposed the use of particular winding patterns to compensate for non-reciprocities in "Compensation of Linear Sources of Non-Reciprocity in Sagnac Interferometers", *Fiber Optics and Laser Sensors I*, Procs. SPIE, v. 412, p.261 (1983). Furthermore, U.S. Pat. No. 4,793,708 of Bednarz entitled "Fiber Optic Sensing Coil" teaches a symmetric fiber optic sensing coil formed by duopole or quadrupole winding. The coils described in that patent exhibit enhanced performance over the conventional helix-type winding.

U.S. Pat. No. 4,856,900 of Ivancevic entitled "Quadruple-Wound Fiber Optic Sensing Coil and Method of Manufacture Thereof" teaches an improved quadrupole-wound coil in which fiber pinching and microbends due to the presence of pop-up fiber segments adjacent to end flanges are overcome by replacing such pop-up segments with concentrically-wound walls of turns that climb between connecting layers. Both of the aforementioned United States patents are the property of the assignee herein.

Pending U.S. Pat. No. 5,333,214 of Huang et al. entitled "Apparatus For Reducing Magnetic Field-Induced Bias Errors in a Fiber Optic Gyroscope" addresses the suppression of bias errors induced by the Faraday effect in a sensor coil exposed to a magnetic field. The invention disclosed in that patent (property of the assignee herein) teaches the use and design of compensator loops for counteracting the effects of both radially and axially-directed magnetic fields. In either case, a predetermined degree of twist of a preselected fiber twist mode is imposed upon the compensator loop to create a counteracting-corrective Faraday effect.

U.S. Pat. No. 5,371,593 of Cordova et al. entitled "Sensor Coil For Low Bias Fiber Optic Gyroscope", also property of the assignee herein, addresses additional problems related to environmental factors. While acknowledging that the design of the sensor coil can impact the gyro's random walk, bias stability, bias temperature sensitivity, bias temperature-ramp sensitivity, bias vibration sensitivity, bias magnetic sensitivity, scale factor temperature sensitivity, scale factor linearity and input axis temperature sensitivity, the device disclosed in that application discloses a coil for which windings are potted in an adhesive material of a predetermined composition. Careful selection of the potting material (particularly in terms of modulus of elasticity) results in reduction of vibration-induced bias, coil cracking, degradation of h-parameter and temperature-ramp bias sensitivity. The coil is formed on a spool of carbon composite material whose coefficient of thermal expansion approximates that of the overlying fiber windings. In addition, this application discloses that the close matching of the thermal expansion characteristics of the spool and the fiber windings as well as proper selection of the coil potting material will minimize the Shupe-like bias caused by thermal stress that would be otherwise exerted by a standard metallic spool.

Conventional support and spool designs, which feature a substantially-cylindrical hub sandwiched between a pair of end flanges, are difficult to "match" to the potted coil. This is due to the asymmetry of expansions of such coils in response to temperature change. The coefficient of thermal expansion of a potted coil in the axial direction is often on the order of ten (10) to one-hundred (100) times that of the radial direction. Unfortunately, spools of conventional design and material composition exhibit isotropic thermal expansion characteristics. This relative imbalance introduces bias errors through coil stressing and creates bonding and cracking problems. For example, in a spool-and-coil arrangement in which the material of the hub of the spool closely approximates the radial coefficient of thermal expansion of the potted coil, the axial expansion of the coil will exceed that of the hub. As a result, significant axial compression of the coil can occur when the temperature rises since axial expansion of the potted coil is limited by a relatively "fixed" separation distance between the spool's end flanges. Further, the stressing due to differential thermal expansion coefficients at the coil-hub interface can result in either rupture or in coil cracking. On the other hand, in a spool fabricated of material closely matching the axial coefficient of thermal expansion of the potted coil, one may expect the relatively-larger radial expansion of the hub in response to temperature change to degrade performance by squeezing the fiber of the coil whose radial dimension is relatively fixed.

Pending U.S. patent application Ser. No. 08/116,376 of Patterson entitled "Flange-Supported Sensor Coil For a Fiber Optic Gyroscope", property of the assignee herein, discloses a spool designed to address the thermally-induced Shupe bias that results from the above-mentioned thermal incompatibility of conventional spool designs with the asymmetric radial and axial thermal expansion coefficients of potted sensor coils. That application discloses a spool that consists of a single mounting flange and an interior hub. The coil is mounted upon with axis transverse to the plane of the flange. In an alternative embodiment, the coil is split into sections that lie atop and at the bottom of the flange. The coil is free to expand axially because the interior of the coil is separated from the hub by a finite distance. The much smaller radial coefficient of thermal expansion of the coil assures that the separation from the hub needn't be excessive and that undue thermal stressing is not experienced at the coil-flange interface. While the above device exhibits good thermal performance characteristics, it is subject to vibration-induced bias effects that result from the quasi-free standing arrangement of the coil relative to the spool. Such bias effects can become particularly acute in an environment that includes vibrations at the resonance frequency of the potted coil.

Pending U.S. patent application Ser. No. 08/299,585 of Bilinski, et al., property of the Assignee herein, addresses the problem of environmental vibration by providing a hub for a spool of the single-flange type whose outer surface is characterized by a low coefficient of friction. This enables one to wind the coil directly onto the hub and thereby avoid the perils associated with a quasi-free standing arrangement. The integral structure of the coil-plus-spool hub is characterized by much higher resonance frequencies, out of the range of environmental vibrations, than a quasi-free standing coil. Unfortunately, the operative mechanism of such device for overcoming the effects of axial coil expansion relies upon the ability of the potted coil to slide freely upon the surface of the hub. Even slight imperfections in the surface of the hub can occasion a deleterious so-called "stick and slip" phenomenon. This effect can cause irregular and quasi-periodic stressing of the coil fiber resulting in unpredictable bias errors in the gyro output.

SUMMARY OF THE INVENTION

The present invention addresses bias errors associated with the manner of mounting a sensor coil by providing, in a first aspect, a rotation sensor for use in a fiber optic gyroscope. Such sensor includes a spool adapted to receive a coil comprising a plurality of layers of coaxial turns of a continuous optical fiber. The coil is encapsulated in a potting material. The potted sensor coil is characterized by a first coefficient of thermal expansion in the radial direction and by a second coefficient of thermal expansion in the axial direction.

The spool comprises a substantially cylindrical central hub and a substantially-planar flange located at at least one of its opposed ends. Such flange is of a first material that possesses a coefficient of thermal expansion that approximates the first coefficient of thermal expansion of the potted coil. The hub comprises a second material such that the coefficient of thermal expansion of the hub approximates the second coefficient of thermal expansion.

In a second aspect, the invention provides a spool for receiving a potted sensor coil of a fiber optic gyroscope where the potted sensor coil is characterized by radial and axial coefficients of thermal expansion of distinct values. Such spool includes a substantially-cylindrical central hub. A substantially-planar flange is located at at least one end of the hub. The flange comprises a first material having a coefficient of thermal expansion that approximates the radial coefficient of thermal expansion and the hub comprises a second material having a coefficient of thermal expansion such that the coefficient of thermal expansion of the hub approximates the axial coefficient of thermal expansion of said potted coil.

In a third aspect, the present invention provides a gyroscope. The gyroscope includes a light source and an optical fiber for receiving the output of the light source. A sensor coil comprises a plurality of layers of turns of the fiber encapsulated in a potting material whereby the sensor coil is characterized by a first coefficient of thermal expansion in the radial direction and by a second coefficient of thermal expansion in the axial direction. Means is provided for coupling light between portions of the fiber in advance of and subsequent to said coil portion thereof. Means is further provided for applying an artificial bias between beams of light when counterpropagating within the sensor coil.

A photodetector is provided for receiving the interference pattern formed between the counterpropagating beams. Means is provided for analyzing the interference pattern to determine rotation rate. A spool is provided for mounting the sensor coil. Such spool comprises a substantially-cylindrical central hub and at least one substantially-planar flange located transverse to the axis of rotation of the hub at at least one end thereof.

The flange is of a first material having a coefficient of thermal expansion that approximates the first coefficient of thermal expansion of the potted coil. The hub comprises a second material having a coefficient of thermal expansion such that the thermal expansion of said hub approximates the second coefficient of thermal expansion over a predetermined temperature range.

The preceding and additional features and advantages of the present invention will become further apparent from the detailed description that follows. Such description is accompanied by a set of drawing figures. Numerals of the drawing figures, corresponding to those of the written description, point to the various features of the invention. Like numerals refer to like features throughout both the drawing figures and the written description.

DETAILED DESCRIPTION

Figure 2:
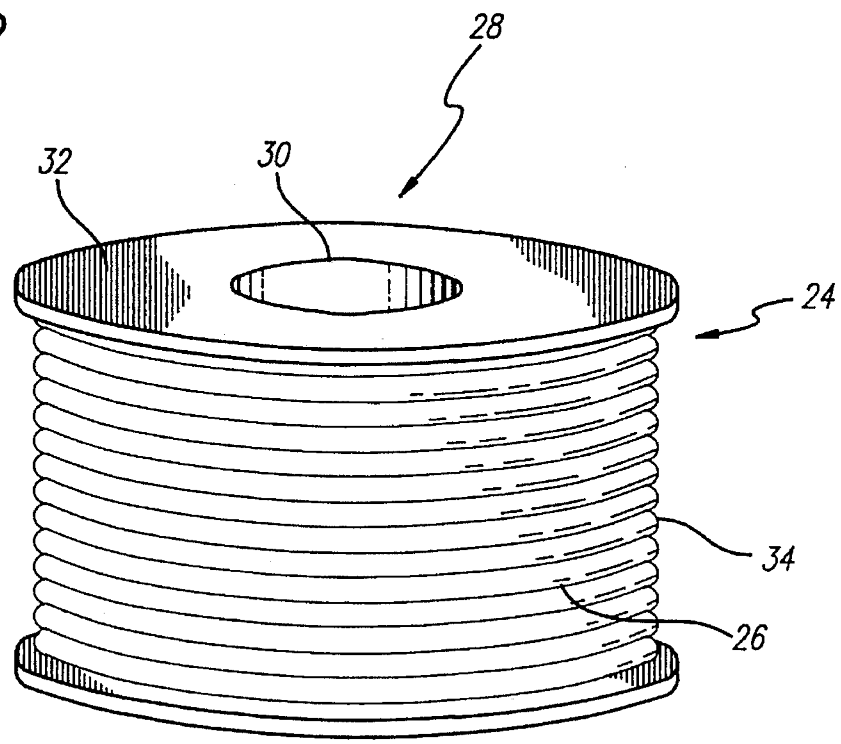
FIG. 2 is a perspective view of the general arrangement of a sensor coil and spool for a fiber optic gyroscope.

FIG. 2 is a perspective view of the general arrangement of a sensor coil 24 for a fiber optic gyroscope comprising a plurality of coaxial turns of an optical fiber 26 mounted with respect to a spool 28. As will be seen below, the spool is, in turn, engaged to a mechanism for precisely aligning the sensitive or input axis of the sensor coil 24 with a predetermined direction in inertial space. While the arrangement of FIG. 2 is intended to present a general configuration, it will be appreciated that alternative configurations can provide the essential spool functions of (1) "anchoring" the sensor coil and (2) aligning the input axis of sensor coil with a predetermined direction in inertial space.

The spool 28 comprises a central, generally-cylindrical hub 30 with at least one transverse flange 32 for mounting the sensor coil 24 which comprises a single continuous optical fiber 26 wound in a predetermined pattern. The spool 28, in prior art arrangements, may be of metallic composition or, alternatively, of a carbon composite composition as taught by pending U.S. Pat. No. 5,371,593 for reducing the differential of thermal expansions of the optical fiber 26 and the spool 28 to minimize temperature-induced Shupe effect stresses to a first order. As further taught by that application, fiber 26 may be embedded or potted within a matrix of adhesive material 34. In addition to enhancing winding precision, the matrix of potting material permits the designer to affect important performance characteristics including a reduction in sensitivity to vibration-induced bias errors.

It is, of course, highly desirable to match the thermal coefficient of the potted coil 24 to that of the associated spool 28. Unfortunately, this is inherently impossible to achieve with known useful materials due to the fact that a sensor coil 24 comprising the continuous optical fiber 26 wound in a generally-cylindrical or annular pattern and embedded in a matrix of the potting material 34 will exhibit coefficients of thermal expansion in the radial and axial directions that differ significantly. For example, coefficients of thermal expansion of 4 ppm/degree C (radial) and larger than 200 ppm/degree C (axial) have been measured in representative potted coils. Such anisotropy of thermal expansions is not matched by the designs and materials of prior art spools which are essentially isotropic and non-directional in terms of coefficient of thermal expansion.

Bias effects result from the incompatibility inherent in the thermal expansion qualities of potted sensor coils and spools of the conventional type that comprise central cylindrical hubs of unitary material fabrication terminating in opposed end flanges. As mentioned above, while the coil is anisotropic with respect to axial and radial thermal expansion, the spool is isotropic. Further, the axial expansion of the potted sensor coil may create stresses at coil-to-hub "anchor points", causing both delamination of the coil from the hub and cracks that propagate through the coil at a forty-five (45) degree angle. Such cracking is observed when the internal stress exceeds the adhesive strength of the bond between the jacket of the fiber coil and the potting material (the axial expansion of a fiber coil mounted to a conventional aluminum spool can create stresses above 500 p.s.i.)

As discussed in the background portion of this application, a number of approaches have been attempted to address the above problems relating to the thermal interaction of sensor coil and spool. Prominent among these have been single flange spool designs that permit free axial expansion. Devices along this line have featured both non-contacting and slip interfaces between the innermost coil layer and the exterior of a central hub that have been hampered by both vibration and so-called "stick-and-slip" problems. Each of such phenomena is capable of inducing additional bias error problems.

Figure 1:
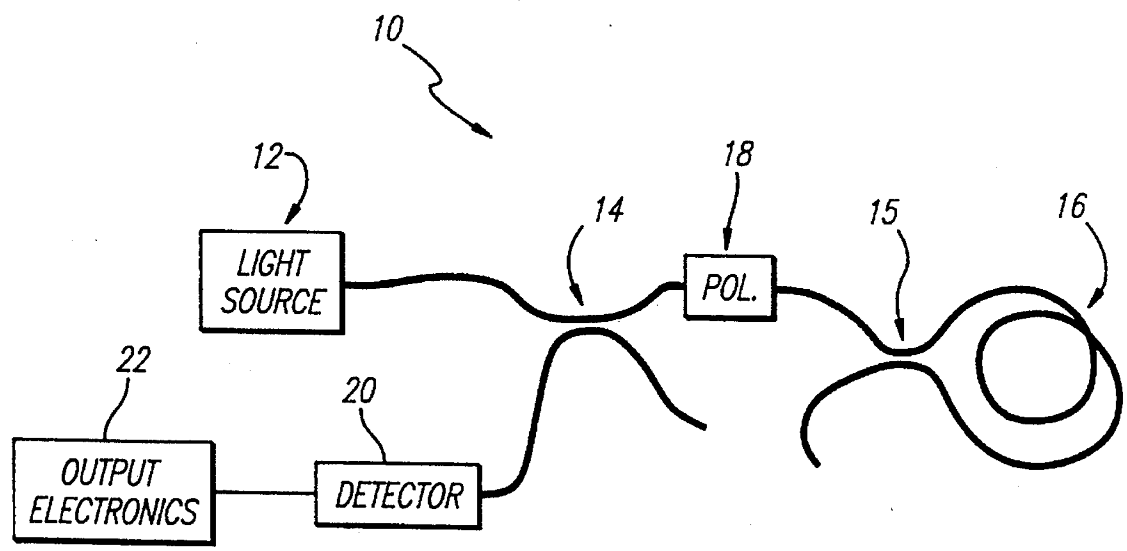
FIG. 1 is a schematic diagram of a fiber optic gyroscope including a sensor coil.
Figure 3:
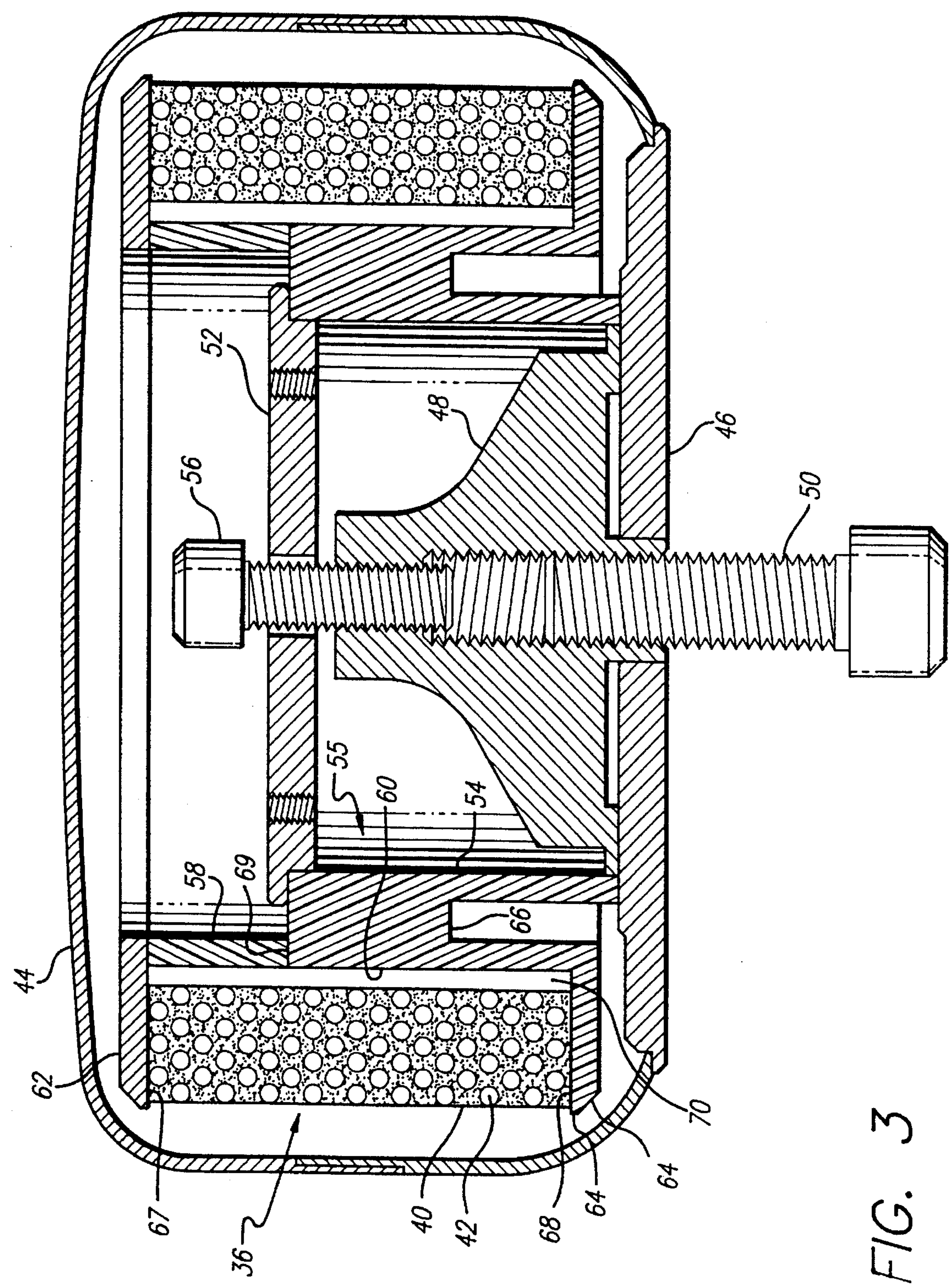
FIG. 3 is a cross-sectional view of a spool in accordance with the invention with a sensor coil mounted thereto and coupled to an inertial navigation system (INS)

The present invention addresses and overcomes the numerous problems of the prior art by providing a spool design, comprising a central hub in combination with at least one end flange, that essentially mimics the anisotropic thermal expansion of a potted sensor coil. FIG. 3 is a cross-sectional view of a sensor coil 36 mounted to a spool in accordance with the invention. The coil 36 corresponds generally to that of FIG. 1, comprising a plurality of layers of turns of a continuous optical fiber 40 that is encapsulated within a matrix of an appropriate adhesive potting material 42. The arrangement is contained within a μ-metal shield 44 that interlocks with a base plate 46. A pedestal 48, preferably formed of stainless steel, receives an elongated member 50 that forms a portion of an inertial navigation system (INS). The elongated member 50 coincides with an input axis of the INS. (Various optical and electrical components are located within the casing formed by the shield 44. Such apparatus is not pertinent to the discussion of the invention and is therefore omitted from FIG. 3.)

A retainer plate 52 sits atop and abuts an inner ring 54 that forms a portion of the central hub 55 of the spool. The overall assembly is secured by means of a bolt 56 that completes a "sandwich" arrangement, including the retainer plate 52, the pedestal 48 and the base plate 46, along with the inner ring 54 of the hub 55.

Returning to the detailed structure of the spool illustrated in FIG. 3, a central hub 55 is apportioned into an upper section 58 of a first material composition and a lower section 60, integral with the inner ring 54, of a second material composition. Flanges 62 and 64 are fixed to opposed ends of the two-piece central hub 55. An annular bridge 66 is integral with and joins the lower section 60 of the hub 55 to the inner ring 54.

As mentioned above, the spool of the invention is arranged to mimic the anisotropic thermal expansion characteristic of a typical potted sensor coil. In a sensor coil, the axial coefficient of thermal expansion is significantly greater than the radial coefficient of the potted and wound sensor coil. Correspondingly, the spool of the invention comprising the central hub 55 in combination with the end flanges 62 and 64 is arranged and fabricated to possess a much larger coefficient of thermal expansion axially than radially. This is accomplished through the combination of design and selective component material compositions.

Referring to the arrangement of FIG. 3, each of the end flanges 62 and 64 is fabricated of material, such as titanium, selected to possess a relatively "low" (i.e., less than approximately 10 ppm/°C.) coefficient of thermal expansion. On FIG. 3, flange 64 is an integral part of the lower section 60 of the spool 55, whereas the flange 62 is bonded to the upper section 58 by means of an appropriate structural adhesive such as Ablebond 931-1 or LCA-49 (the layer 67). (Two flanges are not always required. The upper flange 62 may be omitted for less stringent vibration applications, not requiring the form factor and higher vibration resonances associated with a pair of flanges.) Titanium's coefficient of thermal expansion is approximately $6\times10^{-6}$ ppm per degree Centigrade, approximating the radial coefficient of thermal expansion of a potted sensor coil.

In contrast to the lower section 60, the upper section 58 of the spool hub 55 is formed of material characterized by a significantly higher coefficient of thermal expansion. This provides a central hub 55 whose axial thermal expansion is a composite of the distinguishable characteristics of two components, the relatively-high coefficient upper section 58 and the relatively-low coefficient lower section 60. The lengths of the two hub sections are apportioned so that the axial coefficient of thermal expansion of the composite structure approximates that of the representative potted sensor coil 36.

The upper section 58 is fixed to the abutting lower section 60 by means of a layer 69 of an appropriate adhesive such as Ablebond 931-1 or LCA-49. An appropriate material for forming the upper section 58 of the hub is HMW (High Molecular Weight) high density polyethylene, a polymer. This material possesses a coefficient of thermal expansion in excess of 200 ppm per degree Centigrade. As mentioned earlier, the coefficient of thermal expansion of a representative potted sensor coil in the axial direction may be more than ten (10) times larger than that of the radial direction. By properly apportioning the central hub in accordance with the invention between the upper section 58 of high coefficient of thermal expansion material and the lower section 60 of low coefficient of thermal expansion material and by employing a design that utilizes a low coefficient material for the end flanges, the resultant spool can be designed to attain an anisotropic thermal expansion character that matches, or closely mimics, the anisotropy of the potted sensor coil 36.

A small gap 70 (not drawn to scale in FIG. 3) separates the outer surface of the spool hub 55 from the innermost layer of the potted sensor coil 36. Such gap 70 is provided to prevent localized coil cracking or overstressing resulting from localized mismatches between the expansions of the coil 36 (assumed to be uniform along its axial length) and those of either or both of the substantially differing expansions of the upper section 58 and the lower section 60 of the spool hub 55.

Figure 4:
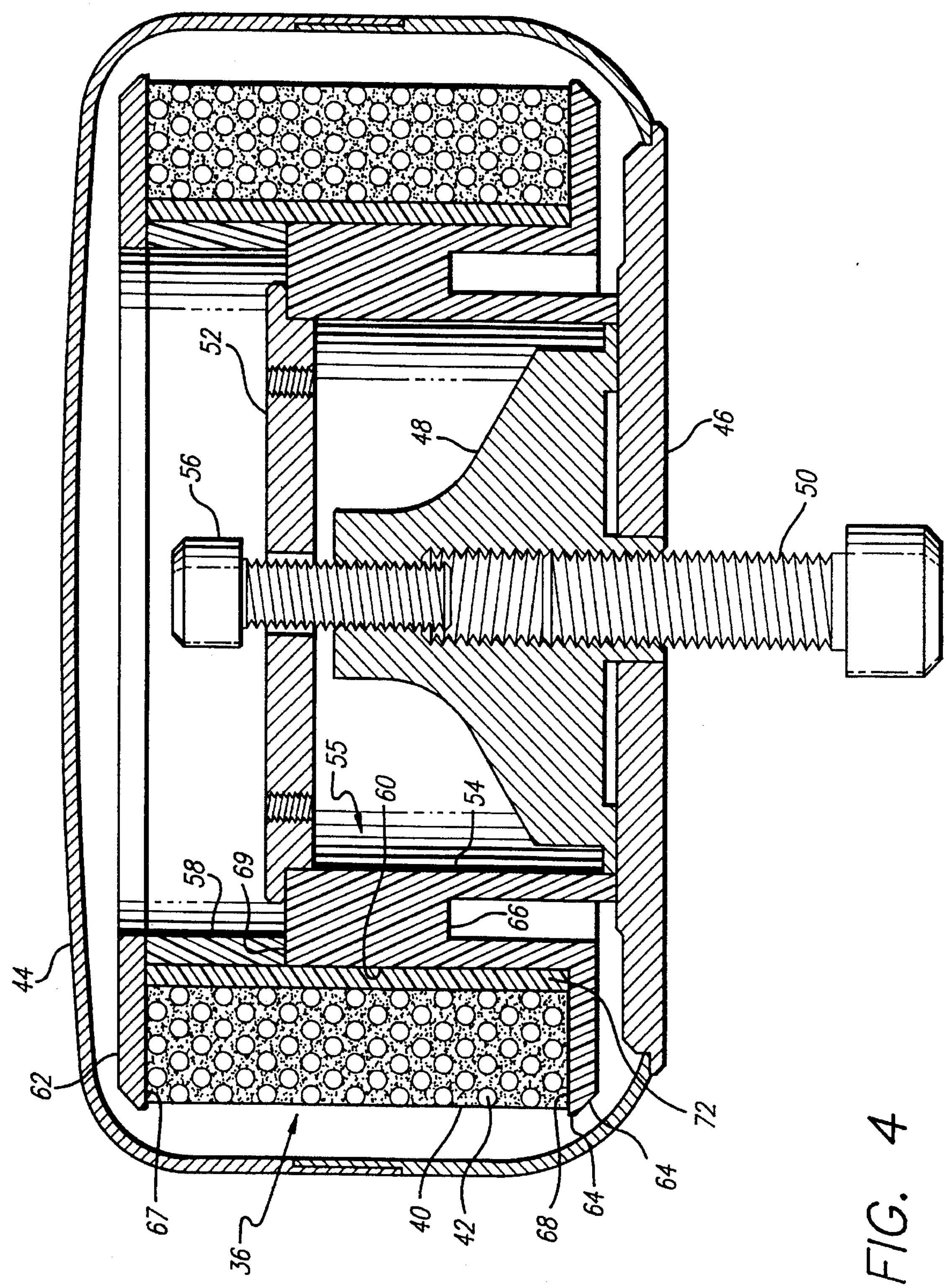
FIG. 4 is a cross-sectional view of a mounted sensor coil for illustrating an alternative embodiment of the invention.

FIG. 4 is a sectional view a spool comprising a central spool hub 55 in combination with end flanges 62 and 64 (with potted sensor coil 36 mounted thereto) in accordance with an alternative embodiment of the invention. The arrangement of FIG. 4 is identical to that of the preceding figure, differing only insofar as the air gap 70 of the preceding embodiment separating the innermost layer of the sensor coil 36 from the outer surface of the central spool hub 55 is filled with a thin layer 72 of ultrasoft silicone. An example of such a material is that commercially available from Dow Corning under the commercial designation "RTV 3140". By so coating the hub 55 with such material, one may wind the optical fiber directly upon the spool to form the sensor coil. This somewhat simplifies manufacture.

Figure 5:
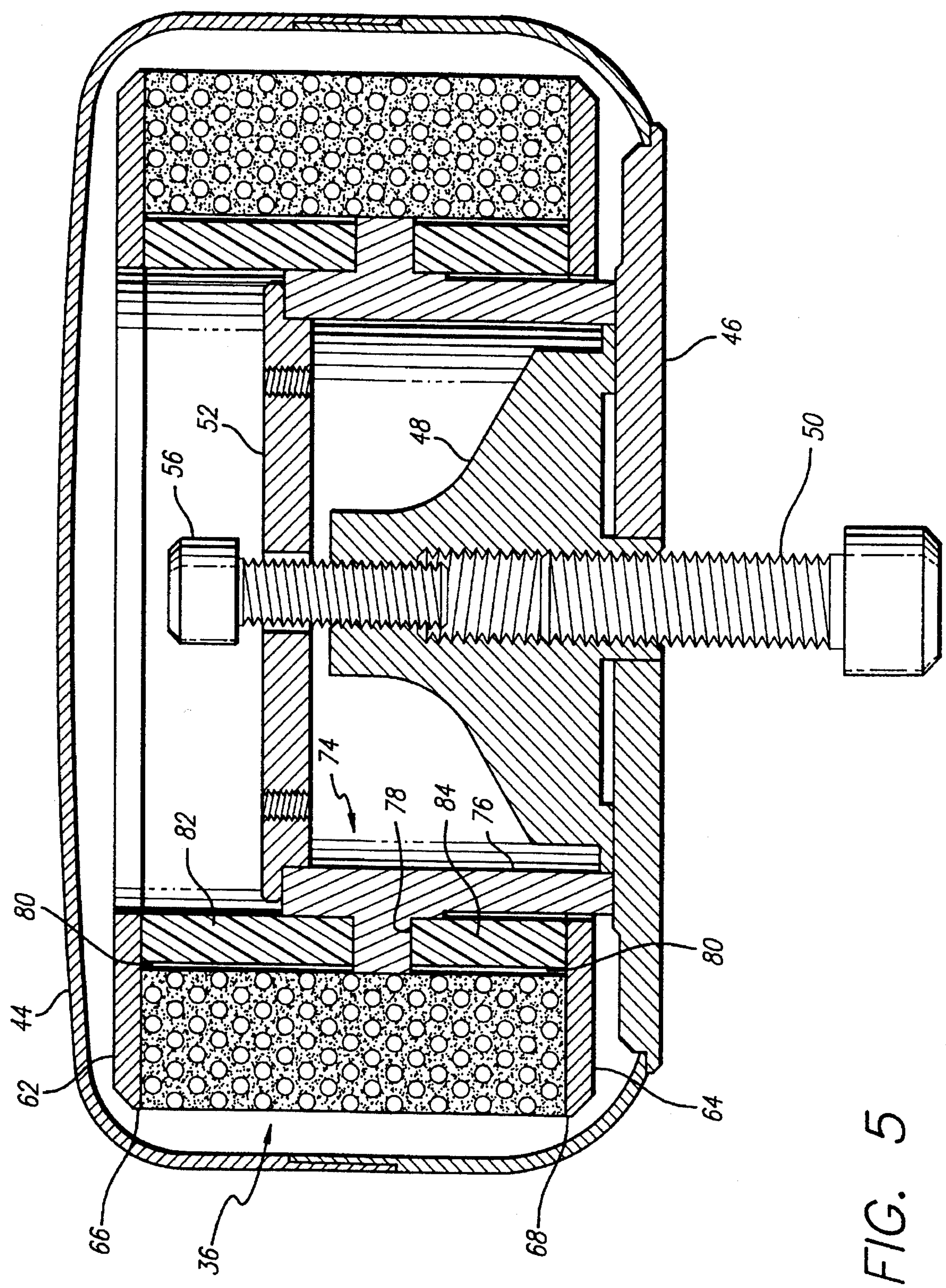
FIG. 5 is a cross-sectional view for illustrating a sensor coil and spool in accordance with a further alternative embodiment of the invention.

FIG. 5 is a cross-sectional view of the potted sensor coil 36 mounted to a spool in accordance with a second alternative embodiment of the invention. In this figure, parts of the central spool hub 74 that are essentially identical to those of the embodiments of FIGS. 3 and 4 are identified by identical numerals to facilitate the comprehension. In contrast to the prior embodiment, the inner ring 76, formed of a low coefficient of thermal expansion material such as titanium, includes an annular, outwardly-directed ridge 78. The ridge 78 is integral with the remainder of the inner ring 76 and is dimensioned to extend through an air gap 80 that separates the innermost layer of the coil 36 from the outer surface of the central hub 74. The hub 74 comprises an upper section 82 in combination with a lower section 84. Each of the sections 82, 84 is formed of a relatively high coefficient of thermal expansion material such as the polymer HMW high density polyethylene, discussed above. The upper section 82 and the lower section 84 are bonded to the upper and lower flanges 62 and 64, and to the flange 78, by means of an appropriate structural adhesive, such as Ablebond 931-1 or LCA-49.

In protruding through the air gap 80, the annular ridge 78 abuts and contacts the inner layer of the potted sensor coil 36. As such, the presence of the ridge 78 serves to suppress the fundamental transverse vibration mode of the coil 36. Such mode would exhibit a maximum in transverse deflection at the position of the ridge 78, resulting in a vibration-induced bias error. The ridge 78 effectively raises the frequency of the fundamental transverse vibration mode of the sensor coil 36 by a factor of two. This puts the resonance frequencies above the typical range of environmental vibration. Thus, the embodiment of FIG. 5 offers improved vibration performance over mounting arrangements in which the central hub of the spool does not contact the sensor coil, despite the presence of an air gap 80 over a portion of the hub/coil interface.

As in the prior embodiments, the high expansion upper and lower sections 82 and 84 are fabricated and apportioned with respect to the height of the low expansion ridge 78 so that the overall expansion of the hub closely approximates the axial expansion of the potted sensor coil 36 when cycled over anticipated operating temperatures. The relatively small area of contact between the low expansion ridge 78 and the sensor coil 36 minimizes the possibility of coil cracking or like problems resulting from a mismatch between the thermal expansion coefficients of contacting materials.

Thus, it is seen that the present invention provides, in its various embodiments, an improved spool design for mounting a fiber optic sensor coil. By employing the teachings of this invention, one may realize a reduction in temperature and vibration-caused bias errors that otherwise characterize the output of a fiber optic gyro. By providing designs that are equally-amenable to single and double flange arrangements, one need not sacrifice vibration performance in addressing gyro bias errors associated with the anisotropic thermal characteristics of conventional potted sensor coils.

While this invention has been described with reference to its presently preferred embodiment, it is not limited thereto. Rather, this invention is limited only insofar as defined by the following set of patent claims and includes all equivalents thereof.

What is claimed is:

1. A rotation sensor for use in a fiber optic gyroscope comprising, in combination:

a) a spool adapted to receive a coil comprising a plurality of layers of coaxial turns of a continuous optical fiber;

b) said coil being encapsulated in a potting material whereby said potted coil is characterized by a first coefficient of thermal expansion in the radial direction and by a second coefficient of thermal expansion in the axial direction;

c) said spool comprising a substantially cylindrical central hub and a substantially-planar flange located at at least one end thereof;

d) said at least one flange being of a first material having a coefficient of thermal expansion that approximates said first coefficient of thermal expansion; and e) said hub comprising a second material so that the coefficient of thermal expansion of said hub approximates said second coefficient of thermal expansion.

2. A rotation sensor as defined in claim 1 further including an inner coupling ring.

3. A rotation sensor as defined in claim 2 wherein said inner coupling ring is of said first material.

4. A rotation sensor as defined in claim 3 wherein an annular member is integral with and projects outwardly from said coupling ring.

5. A rotation sensor as defined in claim 4 wherein said annular member engages said hub.

6. A rotation sensor as defined in claim 5 wherein the interior of said coil is displaced from the outer surface of said hub.

7. A rotation sensor as defined in claim 5 wherein the interior of said coil contacts the outer surface of said hub.

8. A rotation sensor as defined in claim 6 wherein said hub further includes:

a) an upper section of said second material; and b) a lower section, said lower section being integral with said annular member and said coupling ring and comprising said first material.

9. A rotation sensor as defined in claim 8 further including a layer of predetermined material for coating said hub to fill the displacement between said coil and said hub.

10. A rotation sensor as defined in claim 9 wherein said predetermined material comprises silicone.

11. A rotation sensor as defined in claim 8 wherein:

a) said first material comprises titanium; and b) said second material is a polymer.

12. A rotation sensor as defined in claim 7 wherein the outer surface of said annular member contacts the interior of said coil.

13. A rotation sensor as defined in claim 12 further including an upper hub section and a lower hub section of said second material.

14. A rotation sensor as defined in claim 13 wherein:

a) said upper hub section is fixed to and located above said annular member; and b) said lower hub section is fixed to and located below said annular member.

15. A spool for receiving a potted sensor coil of a fiber optic gyroscope, said potted sensor coil being characterized by radial and axial coefficients of thermal expansion of distinct values, said spool comprising, in combination:

a) a substantially-cylindrical central hub;

b) a substantially-planar flange located at at least one end of said hub;

c) said at least one flange comprising a first material having a coefficient of thermal expansion that approximates said radial coefficient of thermal expansion of said potted coil; and d) said hub comprising a second material having a coefficient of thermal expansion such that the coefficient of thermal expansion of said hub approximates said axial coefficient of thermal expansion of said potted coil.

16. A spool as defined in claim 15 further including an inner coupling ring.

17. A spool as defined in claim 16 wherein said inner coupling ring is of said first material.

18. A spool as defined in claim 17 wherein an annular member is integral with and projects outwardly from said coupling ring.

19. A spool as defined in claim 18 wherein said annular member engages said hub.

20. A spool as defined in claim 19 wherein the interior of said coil is displaced from the outer surface of said hub.

21. A spool as defined in claim 19 wherein the interior of said coil contacts the outer surface of said hub.

22. A spool as defined in claim 20 wherein said hub further includes:

a) an upper section of said second material; and b) a lower section, said lower section being integral with said annular member and said coupling ring and comprising said first material.

23. A spool as defined in claim 22 further including a layer of predetermined material for coating said hub to fill the displacement between said coil and said hub.

24. A spool as defined in claim 23 wherein said predetermined material comprises silicone.

25. A spool as defined in claim 24 wherein:

a) said first material comprises titanium; and b) said second material is a polymer.

26. A spool as defined in claim 21 wherein the outer surface of said annular member contacts the interior of said coil.

27. A spool as defined in claim 26 further including an upper hub section and a lower hub section of said second material.

28. A spool as defined in claim 27 wherein:

a) said upper hub section is fixed to and located above said annular member; and b) said lower hub section is fixed to and located below said annular member.

29. A gyroscope comprising, in combination:

a) a light source;

b) an optical fiber for receiving the output of said light source;

c) a sensor coil comprising a plurality of layers of turns of said fiber encapsulated in a potting material, said potted sensor coil being characterized by a first coefficient of thermal expansion in the radial direction and by a second coefficient of thermal expansion in the axial direction;

d) means for coupling light between portions of said fiber in advance of and subsequent to said sensor coil portion thereof;

e) means for applying an artificial phase shift bias between beams of light when counterpropagating within said sensor coil;

f) a photodetector for receiving the interference pattern formed between said counterpropagating beams;

g) means for analyzing said interference pattern to determine rotation rate;

h) a spool for mounting said sensor coil, said spool comprising a substantially-cylindrical central hub and at least one substantially-planar flange, transverse to the axis of rotation of said hub, at at least one end thereof;

i) said at least one flange being of a first material having a coefficient of thermal expansion that approximates said first coefficient of thermal expansion; and j) said hub comprising a second material having a coefficient of thermal expansion such that the thermal expansion of said hub approximates said second coefficient of thermal expansion over a predetermined temperature range.

* * * * *